March 2, 1971 H. C. WEIDNER, JR Re. 27,085

SHOULDERED WASHER AND FASTENING ELEMENT

Original Filed May 13, 1964

INVENTOR.
HARRY C. WEIDNER, JR.
BY Jack M. Young
ATTORNEY

United States Patent Office

Re. 27,085
Reissued Mar. 2, 1971

27,085

SHOULDERED WASHER AND FASTENING ELEMENT

Harry C. Weidner, Jr., Shaker Heights, Ohio, assignor to Atlas Bolt and Screw Company, Cleveland, Ohio Original No. 3,286,577, dated Nov. 22, 1966, Ser. No. 367,079, May 13, 1964. Application for reissue Nov. 21, 1968, Ser. No. 785,823

Int. Cl. F16b *35/00, 43/00*

U.S. Cl. 85—1 14 Claims

Matter enclosed in heavy brackets [ ] appears in the original patent but forms no part of this reissue specification; matter printed in italics indicates the additions made by reissue.

*ABSTRACT OF THE DISCLOSURE*

*An assembly of a washer and fastening element, or a washer for use with a fastening element, having a shank with an enlarged head at one end thereof, wherein the washer comprises a backing member adapted to bear against the enlarged head and a rubber-like sealing ring secured to the opposite surface of the backing member. The backing member and the sealing ring are both provided with centrally disposed holes for receiving the shank of the fastening element. The backing member further includes axially directed portions contiguous to the sealing ring for determining the driven position of the fastening element and the washer.*

This invention relates to improvements in a washer, or fastener and sealing washer.

One of the objects of the present invention is to provide a sealing washer having good sealing characteristics and a long wear life.

Another object of the present invention is to provide an assembled headed fastener and sealing washer.

Another object of the present invention is to provide a sealing washer for a fastening element having fastening element receiving member engagement *or coacting* portions at the hole therein to control the driving and sealing action thereof.

In the art of a sealing washer consisting of a stiff backing member and a resilient sealing member, a prevalent problem is that excessive pressure will cause the washer to collapse in the vicinity of the hole, to become concave, and thus to cause the sealing material to flow away from the hole where it is most needed. The present invention provides a sealing washer constructed to overcome [this problem.] *any or all of these problems.*

A further object of the present invention is to provide a sealing washer or fastener and sealing washer characterized by its economy of manufacture or operation, structural simplicity, ease of use, and many functional advantages.

These and other objects of the present invention will become more fully apparent by reference to the appended claims as the following detailed description proceeds in reference to the accompanying drawings wherein:

Figure 1:
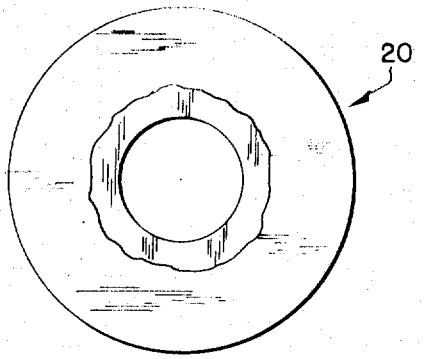
FIG. 1 is a top plan view of the washer of the present invention.

Washer 20 disclosed herein is usable in many ways but is especially adapted to be used with any type fastening element, such as a self-tapping or machine bolt or screw, bolt, screw, nail, etc. Here, washer 20 is shown on screw or fastening element 10 having head 10a secured at one end of threaded shank 10b with annular radiused shoulder 10c located at the junction thereof. Washer 20 is adapted to telescope over the shank and fit under head 10a. However, it should be readily apparent that washer 20 disclosed herein is adapted to fit under a nut head as well as a bolt head.

*The assembled washer 20 and fastening element 10 is adapted to be screwed as an assembly into fastening element receiving member 30 into any suitable driven position. If this assembly is driven into the fully driven position in FIG. 4, it should be apparent that this assembly must inherently move through a partially driven position wherein the end of sleeve 21d (the right-hand end in FIGS. 2, 3 and 4) does not yet engage fastening element receiving member 31, has some of rubber-like ring 22 still spaced between this end of sleeve 21d and fastening element receiving member 30, and this end has pierced the rubber-like ring 22 to a position intermediate that shown in FIGS. 2 and 4. The description hereafter will primarily emphasize the mode of assembly, driving and advantages for the fully driven position in FIG. 4. However, it should be apparent that many of these advantages can be obtained by driving the assembly into only the partially driven position. Since many of the advantages for the fully driven position also are found in the partially driven position, the advantages for this partially driven position will be briefly described near the end of this specification. It is intended that the word "driven position" herein refers generically to both the fully driven position and any partially driven position and that all of these driven positions come within the scope of the present invention. Also, any reference to sleeve 21d "piercing" rubber-like ring 22 is intended by the word "pierce," "piercing," or like word to refer to and include either sleeve 21d passing completely through ring 22 into the driven position shown in FIG. 4 or sleeve 21d passing further into ring 22 than shown in FIG. 2 (but not passing through this ring 22 into the fully driven position in FIG. 4) as would occur in a partially driven position.*

Figure 2:
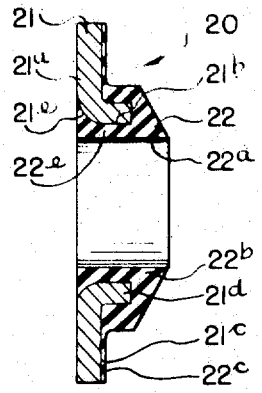
FIG. 2 is a longitudinal sectional view of the washer in FIG. 1.
Figure 3:
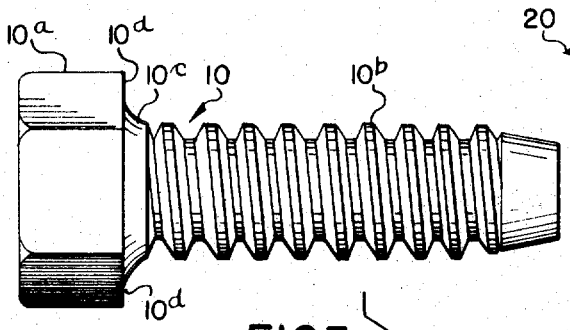
FIG. 3 is a longitudinal sectional view of the washer in FIG. 2 and a screw, shown as one typical form of fastening element, aligned for axial assembly.

Washer 20 includes backing member 21 made of sheet or plate steel, or any other suitable rigid and inflexible non-metallic material, such as Bakelite, to which sealing member 22 may be secured but is shown specifically herein as being made to steel. Backing member 21 has one face 21a adapted to bear against head 10a in the driven position, has hole 21b extending therethrough adapted to be telescoped over shank 10b and has opposite face 21c secured to rubber-like ring 22. Backing member 21 may be either flat and planar, as shown in FIG. 2 or dished into a convex top surface.

Figure 4:
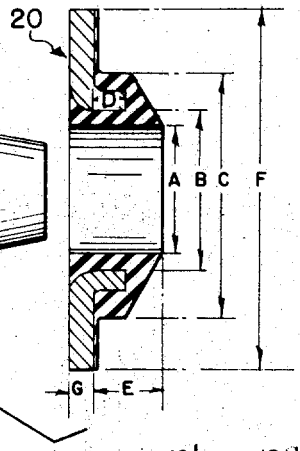
FIG. 4 is a longitudinal sectional view with the screw and washer in *fully* driven position.
Figure 4:
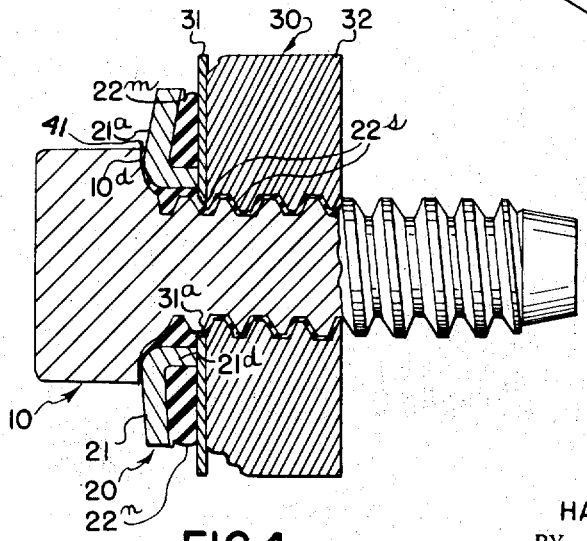

When hole 21b is pierced in backing member 21, a column or sleeve of metal 21d is extruded for controlled distance D, which distance is exactly that required to provide the best possible seal when the washer is driven, as shown in FIG. 4. This extruded sleeve 21d projects from face 21c with the bore of sleeve 21d forming hole 21b and forming dish-shaped junction 21e with face 21a of backing member 21. It should be readily apparent that sleeve 21d contains a plurality of pairs of diametrically aligned or projecting portions as parts thereof contiguous to, spaced around and straddling said hole, projecting from face 21c, and adapted to engage fastener receiving member 31 in the fully driven position in FIG. 4 in the manner brought out in more detail hereinafter.

Washer 20 includes rubber-like ring 22 secured to opposite face 21c of backing member 21, encasing sleeve 21d, extending into hole 21b in backing member 21, having hole 22a formed at least partially therethrough with said holes being coaxial, and extending into the dish-shaped junction 21e of backing member 21. This rubber-like ring is formed of any suitable rubber-like material, such as neoprene, natural rubber, synthetic rubber, elastomer, or any other material having suitable resilient and compressible characteristics for providing the sealing and other functions disclosed herein. Ring 22 is cemented, bonded, or otherwise secured to the entire surface of backing member 21 into which it comes in contact and so that holes 21b and 22a are coaxially aligned. Ring 22 includes an annular central portion 22b having a semi-conical surface most remote from backing member 21 tapering away from backing member 21; and includes an integral film or thin sheets 22c extending outwardly from central portion 22b, bonded to and coextensive with the exposed portion of face 21c, and having a thickness preferably in the range of 0.005–0.020 inch. Central portion 22b includes annular sleeve or ring-like portion 22e extending within the bore of hole 21b in backing member 21 and in sleeve 21d to frictionally engage shank 10b of fastening element 10 and to provide a good seal thereon, as [well] *will* be more readily apparent hereinafter.

Washer 20 is assembled on screw 10 by inserting shank 10b through aligned holes 21b, 22a in washer 20 until head 10a engages backing member face 21a during this assembly. At least a portion of hole 22a is of smaller diameter than the outside diameter of shank 10b to provide a frictional fit to prevent disassembly of washer 20 from screw 10 subsequent to assembly, such as during sale, in transit from manufacturer to user, and during use by the tradesmen installing it.

This assembled fastener and washer is adapted to be driven into a fastening element receiving member 30, here shown as comprising separate member 31 and 32. This may take the form, for example, of a building member or wall 32 and roofing or siding member 31, such as a thin sheet, forming the outer building face. This member 31 may be made of metal, protected metal, corrugated asbestos, or other suitable non-metallic material. Prior to driving fastener 10, a small diameter hole (less than the diameter of threads 10d) is drilled through members 31 and 32. Then, shank 10b is inserted and screwed into this hole to form (when driven) hole 31a and a threaded hole in member 32. Then, member 31 will be firmly retained on member 32 by fastener 10 in the driven position shown in FIG. 4.

As mentioned, this assembled washer and screw is moved into the *fully* driven position in FIG. 4 by having shank 10b inserted through these aligned holes in members 31 and 32, and then applying an axial downward and turning force to head 10a so that the threads thereon will be screwed into threads in member 32. As washer 20 approaches the *fully* driven position shown in FIG. 4, the lead end (the right end in FIG. 4) of sleeve 21d pierces rubber-like ring 22 and subsequently engages fastening element receiving member 31. When the *fully* driven position is reached in FIG. 4, sleeve 21d engages with a circular contact fastening element receiving member 31 so as to provide a material-to-material contacting engagement therewith, here being a metal-to-metal contact because backing member 21 and member 31 are preferably formed of metal.

The axial length D of sleeve 21d is accurately made so that the best possible seal occurs when fastening element 10 and washer 20 are fully seated in the driven position, *either a partially driven position or the fully driven position* shown in FIG. 4. The axial height thereof from face 21c is sufficient [to engage and] to determine this driven position.

This sleeve 21d provides numerous advantages, *especially described for the fully driven position,* given in the numbered paragraphs hereafter.

First, it provides a consistent end-stop with head 10a, face 21a, sleeve 21d, and members 31 and 32 pushed axially together in tight metal-to-metal contact in *fully driven position in FIG. 4.* This end-stop assures that the same, consistent, good seal and other good results are always obtained.

Second, rubber-like ring 22 and sleeve 21d provide a good seal in the driven position between opposite face 21c of backing member 21 and the adjacent face of fastening element receiving member 31 and between shank 10b and receiving hole 31a in fastening element receiving member 31. Multiple seals are provided with rubber-like ring 22 being in a high state of compression to provide a good seal. These seals include: (1) a metal-to-metal sleeve type seal encircling screw shank 10b, provided by the contact of sleeve 21d and member 36, and having highly compressed rubber located both on the inside and the outside of sleeve 21d, (2) rubber-like material 22e within the bore of sleeve 21d and within hole 21b frictionally engaging shank 10b and providing a good seal thereon; (3) radiused shoulder 10c having substantially the same radius contour as dish-shaped junction 21e to bear thereagainst to squeeze rubber-like sleeve 22a to make thereat a good metal-to-metal and/or rubber seal; (4) extruded sleeve 21d providing a circular metal-to-metal contact with member 31 to provide a metal-to-metal seal therewith; (5) during the movement of washer 20 toward the driven position in FIG. 4, sleeve 21d piercing rubber-like ring 22 and acting as a driving ram to drive the rubber-like material thereof under high pressure axially into hole 31a to form seal 22s around threads 10d. Hence, a plurality of separate and independent seals are provided, including: (1) a rubber-like seal between face 21c and member 31, (2) a metal-to-metal circular seal between sleeve 21d and member 31, (3) a rubber-like seal between the bore of sleeve 21d and the threaded shank 10b and head 10a, and (4) a rubber-like seal between threaded shank 10b and hole 31a.

Third, engagement of sleeve 21d provides a positive stop preventing over-driving and over-torqueing fastening element 10. This is important because over-driving tends to destroy the sealing properties of rubber-like seal 22.

Fourth, sleeve 21d prevents radially outward drive-out of the rubber-like sealing material [. The] *for numerous reasons. First, sleeve 21d acts like a confining fence for the rubber-like material or like a circular anchor embedded in the rubber to prevent radially outward drive-out of the rubber-like sealing material. Second, the* axial stiffness of sleeve 21d prevents collapse of backing member 21 around hole 21b. Such collapse *without this fence or anchor* would tend to cause flow of this rubber-like ring 22 in a radial direction outwardly away from threaded shank 10b and hole 31a, where it is needed for proper sealing action. Hence, sleeve 21d retains the rubber-like material around shank 10b, where it is needed for sealing, instead of permitting it to be driven out of sealing contact.

Fifth, backing member 21 and sleeve 21d not only prevent outward flow of the rubber-like material but actually crowd it into good sealing engagement. Backing member 21, including its sleeve 21d, is so characterized as to size, thickness, stiffness and flexibility that if sufficient driving force is applied to head 10a of fastening element 10 after sleeve 21d *reaches the partially driven position or* engages fastening element receiving member 31 *in the fully driven position in FIG. 4,* the periphery of face 21c is turned downwardly toward fastening element receiving member 31 and face 21c assumes a concave shape in a very desirable manner, as shown in FIG. 4, so as to restrict outward flow of rubber-like ring 22 and to compress this rubber-like material tighter so as to give a good sealing action around fastener shank 10b.

This flexure of face 21c is the opposite of what happens if you over-torque a screw without sleeve 21d on backing member 21. If backing member 21 were flat and did not have sleeve 21d, over-torqueing the screw would cause face 21c to become convex as the portion of backing member 21 around hole 21b collapsed, and this convex shape would force the rubber-like material to flow radially outwardly to spoil the seal.

Figure 5:
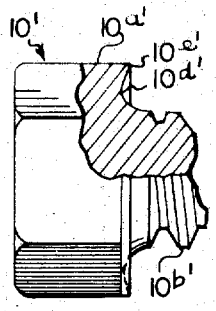
FIG. 5 is a modified form of screw head usable with the washer in FIGS. 1 and 2.

This concaving effect on face 21c is obtained here by having all of screw head face 10d, located outwardly from radiused shoulder 10c, lying wholly *or generally* in a common plane extending perpendicular to the longitudinal axis of screw 10. Hence, the convex shape of face 21a may form annular gap 41 with face 10d in FIG. 4. If it is desired to emphasize this action and get a better concaving or crowding action, screw head 10a may take the form of screw head 10a' on screw 10' in FIG. 5 with annular lip 10e' on face 10d'. Lip 10e' diverges from head 10a' as the distance from shank 10b' increases and bears against face 21a so as to be capable of not only filling gap 41 but also putting a positive axial pressure on face 21a to force face 21c into a concave shape and toward sheet 31.

Locating sleeve 21d *only* around the outer periphery of face 21c, instead of at the inner edge of face 21c around hole 21b as shown in FIG. 2, will not give the same desirable results for many reasons. First, excessive torqueing of the fastening element will make bottom face 21c of the washer convex. Second, the metal-to-metal contact, *if only* outside the sealing rubber-like material, is not desirable because this metal contact may possibly injure the surface of fastening receiving member 31. This injury may damage surface finish on sheet 31 not only to make an undesirable appearance, but also to permit corrosion to occur. Third, the portion of rubber-like ring 22 in dish-shaped junction 21e will not be provided. This portion has a very desirable sealing action with shoulder 10c and head 10a. Fourth, sleeve 21d, being located directly below and axially aligned with fastener head 10a, provides a positive stop for fastener head 10a. If this sleeve were located at the outer periphery of face 21c, it would not be axially aligned with the head that it would stop. Fifth, face 21c will not be bent in the concave manner shown in FIG. 4 to obtain the desirable advantages mentioned heretofore, such as preventing outward escape of the rubber-like material and crowding it inwardly. Sixth, lack of sleeve 21d in the location shown will not give the ram-type driving action to the rubber-like sealing material and will not provide two separate and distinct rubber-like seals inside of and outside of the metal sleeve.

Sleeve 21d, acting as a stop member, is more desirable than having a stop in the form of a stop shoulder on screw 10 below head 10a. Sleeve 21d is less expensive to manufacture in volume production than such a shouldered screw. Only a slight change is required in the stamping die and no separate machining operation is required on the screw. Screws 10 can be used.

Additional advantages of washer 20 are readily apparent, as set forth in the following numbered paragraphs.

First, metal backing member 21 has advantages. It serves as a bearing for relative turning movement of metal screw head 10a so that rubber-like sealing member 22 is not distorted by screw head 10a turning movement. The portion of ring 22 in dish-shape junction 21e does not extend above face 21a prior to applying a substantial amount of driving force to screw 10 so that face 21a may provide head 10a with a metal-to-metal bearing engagement. When the parts reach the driven position in FIG. 4, this portion of ring 22 will be squeezed against head 10a to provide a good sealing action against the bottom of head 10a.

Second, the axial thickness of ring 22 adjacent holes 21b and 21e provides advantages. This thickness assures that the rubber-like material will grip shank 10b securely when assembled on screw 10, that more of this rubber-like material will be forced down into at least hole 31a as seal 22s so as to seal the aligned holes in members 31 and 32, and that this rubber-like material will provide good sealing between members 21 and 31 under pressure. Third, in the driven position of FIG. 4, rubber-like ring 22 will not have its outer edge 22n in FIG. 4 extending outwardly beyond the outer edge of backing member 21 because of the shape and characteristics of the parts. The rubber-like outer edge 22n in FIG. 4, formed by compressed center portion 22b will be kept within the outer edges of backing member 21 even under extreme compression. This is important because this feature improves the appearance of washer 20 and prevents progressive deterioration of the rubber-like material by having backing member 21 protect rubber-like member 22 from sun light and exposure to other elements when member 31 is exterior sheeting on a building. The improved appearance results because metal members 21 and 31 are the only ones exposed in use so that the building appears to have a continuous metal outside face instead of having rings of rubber thereon, as would appear if edge 22n of member 22 extended beyond the outer edges of backing member 21 in FIG. 4. Film 22c resists lateral outward movement of center portion 22b so that this rubber-like center portion will be crowded inwardly into sealing engagement with shank 10b. As this center portion 22b attempts to move laterally outwardly over member 31, it will form lip 22n on the outer edge of fold 22m bearing in face-to-face contact in FIG. 4 against the underside of bonded film 22c integrally formed of the same material. This rubber-to-rubber surface contact by the same material along fold 22m will cause increased resistance by cohesional and frictional forces of engagement of the same rubber-like material resisting outward movement of lip or outer edge 22n because film 22c is firmly bonded to rigid metal member face 21c. Also, outwardly curling lip 22n forms with the outer edge of film 22c two fluid seal lips effectively sealing the space at the bottom and the top between members 21 and 31. Also, film 22c prevents any electrolytic corrosion action tended to be caused by liquid, such as rain water on the exterior of a building, and by any dissimilarity in metal material of members 21 and 31, such as when they are made of aluminum and steel respectively. Even when the water gets in the space under film 22c in FIG. 4 between members 21 and 31, the electrical insulating film 22c, which covers the entire face 21c of backing member 21, will prevent the electrolytic action.

The dimensions of one operable form of screw 10 and washer 20 are given here. The dimensions are:

A=0.230 inch
B=0.265 inch
C=7/16 inch
D=0.040 inch
E=0.140 inch
F=0.546–.625 inch
G=20 gage (0.0359 inch)
10b: #14 or ¼" American Standard screw thread
10a: standard ⅜" (across flats) hex head

*If driving of the assembled washer 20 and fastening element 10 is stopped in the earlier described partially driven position before the fully driven position in FIG. 4 is reached, this partially driven position (called generically herein "driven position") has many of the advantages of the fully driven position. This partially driven position has the end of sleeve 21d (the right-hand end in FIGS. 2, 3 and 4) not engaging fastening element receiving member 31, partially spaced therefrom by some of the rubber-like material in ring 22, but piercing this rubber-like material to a position intermediate the FIG. 2 and FIG. 4 positions. Each of these advantages in this partially driven position may be obtained by one or more of the following factors: (1) the mere presence of sleeve 21d in the combination; (2) the action of sleeve 21d on the rubber-like material in ring 22, etc. while the assembly is moved into the partially driven position to perform the same functions as it did while moving into this partially driven position on the way to the earlier described driven position; (3) the last mentioned some rubber-like*

*material is compressed in this partially driven position by this driving action between this right-hand end of sleeve 21d and fastening element receiving member 30 to provide somewhat the equivalent of a metal, ring-like extension on sleeve 21d since the compressed rubber-like material may act in some ways functionally as a driving stop like ring 21d; etc. Hence, the partially driven position may give substantially all of the many aforedescribed advantages for the fully driven position except the actual metal-to-metal contact and actual metal-to-metal seal. For example, sleeve 21d provides in the partially driven position the consistent driving end-stop, numerous good seals, prevention of radially outward drive-out of the rubber-like sealing material, crowds this rubber-like material into good sealing engagement, and the rubber-like material will be forced into many good sealing positions, as earlier described.*

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A washer for use with a fastening element comprising a shank having a head at one end, said washer comprising a backing member having one face adapted to bear against said head and having a hole extending therethrough to receive said shank, said washer having axially directed projecting portions contiguous to and spaced around said hole and projecting from the opposite face of said backing member, said washer having a rubber-like sealing ring secured to the opposite face of said backing member, said ring having a hole extending at least partially therethrough and being generally coaxial with the hole in said backing member for receiving said shank, said projecting portions having an axial heighth from said opposite face less than the axial thickness of the sealing ring and being sufficient to engage a fastening element receiving member and to determine the driven position of said fastening element and washer therein, the rubber-like sealing ring having rubber-like portions located on said projecting portions on the radially inner surface thereof, some portions of said rubber-like sealing ring being located remote from said opposite face so that some of the rubber-like portions are forced down into the fastening element receiving member hole, the heighth of said projecting portions being such that said rubber-like ring provides a good seal in the driven position between the opposite face of said backing member and said fastening element receiving member and between said shank and the receiving hole therefor in said fastening element receiving member.

2. A washer for use with a fastening element comprising a shank having a head at one end, said washer comprising a backing member having one face adapted to bear against said head and having a hole extending therethrough to receive said shank, said washer having projecting portions spaced around said hole and projecting from the opposite face of said backing member, said washer having a rubber-like sealing ring secured to the opposite face of said backing member and to at least some of each of said portions, said ring having a hole extending at least partially therethrough and being generally coaxial with the hole in said backing member for receiving said shank, said projecting portions having an axial heighth from said opposite face sufficient to engage a fastening element receiving member and to determine the driven position of said fastening element and washer therein, said backing member having an integral annular sleeve projecting from said opposite face around said hole in said ring and containing said projecting portions as portions thereof, said sleeve being constructed to engage with a circular contact said fastening element receiving member in said driven position so as to provide a material-to-material contacting seal therewith, said backing member, projecting portions and seal-like ring being so dimensioned that if sufficient driving force is applied to the head of said fastening element after said projecting portions engage said fastening element receiving member, the periphery of said backing member is turned downwardly toward said fastening element receiving member and said opposite face assumes a concave shape to restrict the outward flow of said rubber-like ring for providing a good sealing action around said fastener, an annular portion of said rubber-like ring extending within the bore of the hole in said backing member and within said sleeve to frictionally engage the shank of said fastening element and to provide a good seal therein, and portions of said rubber-like ring being forced into the space between said shank and the hole in said fastening element receiving member and being located both inside and outside said sleeve outwardly from said fastening element receiving member to form a multiplicity of seals in said driven position, the heighth of said sleeve being such that said rubber-like ring provides a good seal in the driven position between the opposite faces of the backing member and said fastening element receiving member and between said shank and the receiving hole therefor in said fastening element receiving member, said sleeve being encased in said rubber-like ring so that driving said fastening element to said driven position causes said sleeve to pierce said rubber-like ring and to engage the fastening element receiving member so that the rubber-like ring is in a high state of compression for providing a good seal, the end of said sleeve most remote from said backing member bearing against said fastening element receiving member, said fastening element comprising a screw having a threaded shank, portions of said rubber-like sealing ring forced by said sleeve down into the hole in said fastening element receiving member around the threads on said shank, and the opposite face of said backing member being bent into a concave shape restricting outward flow of said rubber-like ring.

3. A washer for use with a fastening element comprising a shank having a head at one end, said washer comprising a backing member having one face adapted to bear against said head and having a hole extending therethrough to receive said shank, said washer having axially directed projecting portions contiguous to and spaced around said hole and projecting from the opposite face of said backing member, said washer having a rubber-like sealing ring secured to the opposite face of said backing member, said ring having a hole extending at least partially therethrough and being generally coaxial with the hole in said backing member for receiving said shank, said projecting portions having an axial heighth from said opposite face less than the axial thickness of the sealing ring and being sufficient to engage a fastening element receiving member and to determine the driven position of said fastening element and washer therein, the projecting portions having inner surfaces facing the axis of the hole, the rubber-like sealing ring having rubber-like portions located on said inner surfaces and dimensioned to frictionally engage the fastener shank in assembled position prior to driving, the heighth of said projecting portions being such that said rubber-like ring provides a good seal in the driven position between said shank and the receiving hole therefor in said fastening element receiving member.

4. A washer, as set forth in claim 3, with said projecting portions arranged in the form of a sleeve around the axis of said hole to improve the sealing action with said rubber-like sealing ring and fastening element receiving member.

5. A washer for use with a fastening element comprising a shank having a head at one end with a clamping surface at the underside thereof, said washer comprising a relatively rigid backing member having one face adapted to bear against said clamping surface, said washer having a hole extending therethrough to receive said shank, said backing member having rigidly connected projecting portions contiguous to and spaced around said hole and projecting at least partially in an axial direction from the opposite face of said backing member, said washer having a rubber-like sealing ring secured to the opposite face of said backing member and being substantially within the bounds of the periphery of said backing member, said ring having a hole extending at least partially therethrough and being generally coaxial with the hole in said backing member for receiving said shank, said projecting portions having an axial heighth from said opposite face sufficient to engage a fastening element receiving member as a positive stop and to determine the driven position of said fastening element and washer therein, said heighth being less than the axial thickness of the sealing ring; the one face of said backing member having a surface interengageable wtih a surface on the clamping face of said head with said interengageable surface on said backing member extending a given distance radially outwardly relative to the outer diameter of said projecting portions, said interengageable surface on said one face being so constructed, designed and arranged that upon sufficiently tightening of said fastener said given distance will provide a surface engagement between said clamping surface and said one face generating a component of force on said backing member toward said fastening element receiving member causing said backing member to be turned downwardly toward said fastening element receiving member and said opposite face to assume a concave shape to restrict the outward flow of said rubber-like ring for providing a good sealing action around said fastener.

6. A washer, as set forth in claim 5, with said projecting portions arranged in the form of a sleeve around the axis of said hole to improve the sealing action with said rubber-like sealing ring and fastening element receiving member.

*7. A washer for use with a fastening element comprising a shank having a head at one end, said washer comprising a backing member having one face adapted to bear against said head and having a hole extending therethrough to receive said shank, said washer having generally axially directed projecting portions contiguous to and spaced around said hole and projecting from the opposite face of said backing member, said washer having a rubber-like sealing ring secured to the opposite face of said backing member, said ring having a hole extending at least partially therethrough and being generally coaxial with the hole in said backing member for receiving said shank, said projecting portions having an axial heighth from said opposite face less than the axial thickness of the sealing ring and being sufficient to determine the driven position of said fastening element and washer with respect to said fastening element receiving member, the rubber-like sealing ring having rubber-like portions located on said projecting portions on the radially inner surface thereof, some portions of said rubber-like sealing ring being located remote from said opposite face so that some of the rubber-like portions are forced down into the fastening element receiving member hole, the heighth of said projecting portions being such that said rubber-like ring provides a good seal in the driven position between the opposite face of said backing member and said fastening element receiving member and between said shank and the receiving hole therefor in said fastening element receiving member.*

*8. A washer for use with a fastening element comprising a shank having a head at one end, said washer comprising a backing member having one face adapted to bear against said head and having a hole extending therethrough to receive said shank, said washer having projecting portions spaced around said hole and projecting from the opposite face of said backing member, said washer having a rubber-like sealing ring secured to the opposite face of said backing member and to at least some of each of said portions, said ring having a hole extending at least partially therethrough and being generally coaxial with the hole in said backing member for receiving said shank, said projecting portions having an axial heighth from said opposite face sufficient to determine the driven position of said fastening element and washer with respect to said fastening element receiving member, said backing member having an integral annular sleeve projecting from said opposite face around said hole in said ring and containing said projecting portions as portions thereof, said backing member projecting portions and seal-like ring being so dimensioned that if sufficient driving force is applied to the head of said fastening element after said projecting portions engage said fastening element receiving member, the periphery of said backing member is turned downwardly toward said fastening element receiving member to restrict the outward flow of said rubber-like ring for providing a good sealing action around said fastener, an annular portion of said rubber-like ring extending within the bore of the hole in said backing member and within said sleeve to frictionally engage the shank of said fastening element and to provide a good seal thereon, and portions of said rubber-like ring being forced into space between said shank and the hole in said fastening element receiving member and being located both inside and outside said sleeve outwardly from said fastening element receiving member to form a multiplicity of seals in said driven position, the heighth of said sleeve being such that said rubber-like ring provides a good seal in the driven position between the opposite faces of the backing member and said fastening element receiving member and between said shank and the receiving hole therefor in said fastening element receiving member, said sleeve being encased in said rubber-like ring so that driving said fastening element to said driven position causes said sleeve to at least partially pierce said rubber-like ring so that the rubber-like ring is in a high state of compression for providing a good seal, said fastening element comprising a screw having a threaded shank, portions of said rubber-like sealing ring forced by said sleeve down into the hole in said fastening element receiving member around the threads on said shank, and the opposite face of said backing member restricting outward flow of said rubber-like ring.*

*9. A washer for use with a fastening element comprising a shank having a head at one end, said washer comprising a backing member having one face adapted to bear against said head and having a hole extending therethrough to receive said shank, said washer having generally axially directed projecting portions contiguous to and spaced around said hole and projecting from the opposite face of said backing member, said washer having a rubber-like sealing ring secured to the opposite face of said backing member, said ring having a hole extending at least partially therethrough and being generally coaxial with the hole in said backing member for receiving said shank, said projecting portions having an axial heighth from said opposite face less than the axial thickness of the sealing ring and being sufficient to operatively coact with a fastening element receiving member to determine the driven position of said fastening element and washer therein, the projecting portions having inner surfaces facing the axis of the hole, the rubber-like sealing ring having rubber-like portions located on said inner surfaces and dimensioned to frictionally engage the fastener shank in assembled position prior to driving, the heighth of said projecting portions being such that said rubber-like ring provides a good seal in the driven position between said shank and the receiving hole therefor in said fastening element receiving member.*

*10. A washer for use with a fastening element comprising a shank having a head at one end with a clamping surface at the underside thereof, said washer comprising a relatively rigid backing member having one face adapted*

*bear against said clamping surface, said washer having hole extending therethrough to receive said shank, said acking member having rigidly connected projecting porons contiguous to and spaced around said hole and procting at least partially in an axial direction from the pposite face of said backing member, said washer having rubber-like sealing ring secured to the opposite face of aid backing member and being substantially within the ounds of the periphery of said backing member, said ng having a hole extending at least partially therethrough nd being generally coaxial with the hole in said backing ember for receiving said shank, said projecting portions aving an axial heighth from said opposite face sufficient act as a stop relative to said fastening element receiving ember to determine the driven position of said fastening lement and washer therein, said heighth being less than e axial thickness of the sealing ring; the one face of said acking member having a surface interengageable with a urface on the clamping face of said head with said inerengageable surface on said backing member extending given distance radially outwardly relative to the outer iameter of said projecting portions, said interengageable urface on said one face being so constructed, designed nd arranged that upon sufficiently tightening of said fasener said given distance will provide a surface engagenent between said clamping surface and said one face enerating a component of force on said backing member oward said fastening element receiving member causing aid backing member to be turned downwardly toward aid fastening element receiving member and said opposite face to restrict the outward flow of said rubberike ring for providing a good sealing action around said astener.*

*11. A washer, as set forth in claim 1, with said rubberike sealing ring secured to the opposite face of said backng member by a bonded connection.*

*12. An assembly, comprising the washer, as set forth in claim 2, and a fastening element comprising a shank havng a head at one end, said head having a face adjacent aid shank blending into said shank by an annular radiused houlder, said washer having a dish-shaped junction gen-*

*erally bearable against said shoulder and being located at the junction of said one face and the bore of said sleeve.*

*13. An assembly, comprising the washer, as set forth in claim 3, and a fastening element comprising a shank having a head at one end and frictionally engaged by said rubber-like portions of said ring.*

*14. An assembly, comprising a washer, as set forth in claim 5, a fastening element comprising a shank having a head at one end; said fastening element, backing member, projecting portions and rubber-like ring being so dimensioned that when sufficient driving force is applied to the head of said fastening element after said projecting portions engage said fastening element receiving member, the periphery of said backing member is turned downwardly toward said fastening element receiving member and said opposite face assumes a concave shape to restrict the outward flow of said rubber-like ring for providing a good sealing action around said fastener, and being dimensioned to prevent collapse of said backing member around said hole tending to cause flow of said rubber-like ring away from said hole where it is needed for proper sealing action.*

References Cited

The following references, cited by the Examiner, are of record in the patented file of this patent or the original patent.

UNITED STATES PATENTS

| | | | |
|---|---|---|---|
| 316,619 | 4/1885 | Hayes | 85—9 |
| 1,512,896 | 10/1924 | Kraft | 85—50X |
| 2,182,614 | 12/1939 | Garrison | 85—50X |
| 2,852,291 | 9/1958 | Hults | 85—1J.P.X. |
| 3,202,033 | 8/1965 | Weidner | 85—1 |

FOREIGN PATENTS

| | | | |
|---|---|---|---|
| 672,971 | 10/1963 | Canada | 85—1J.P. |
| 659,486 | 10/1951 | Great Britain | 85—1J.P. |

RAMON S. BRITTS, Primary Examiner

U.S. Cl. X.R.

85—50; 277—166, 180